Patented Sept. 28, 1926.

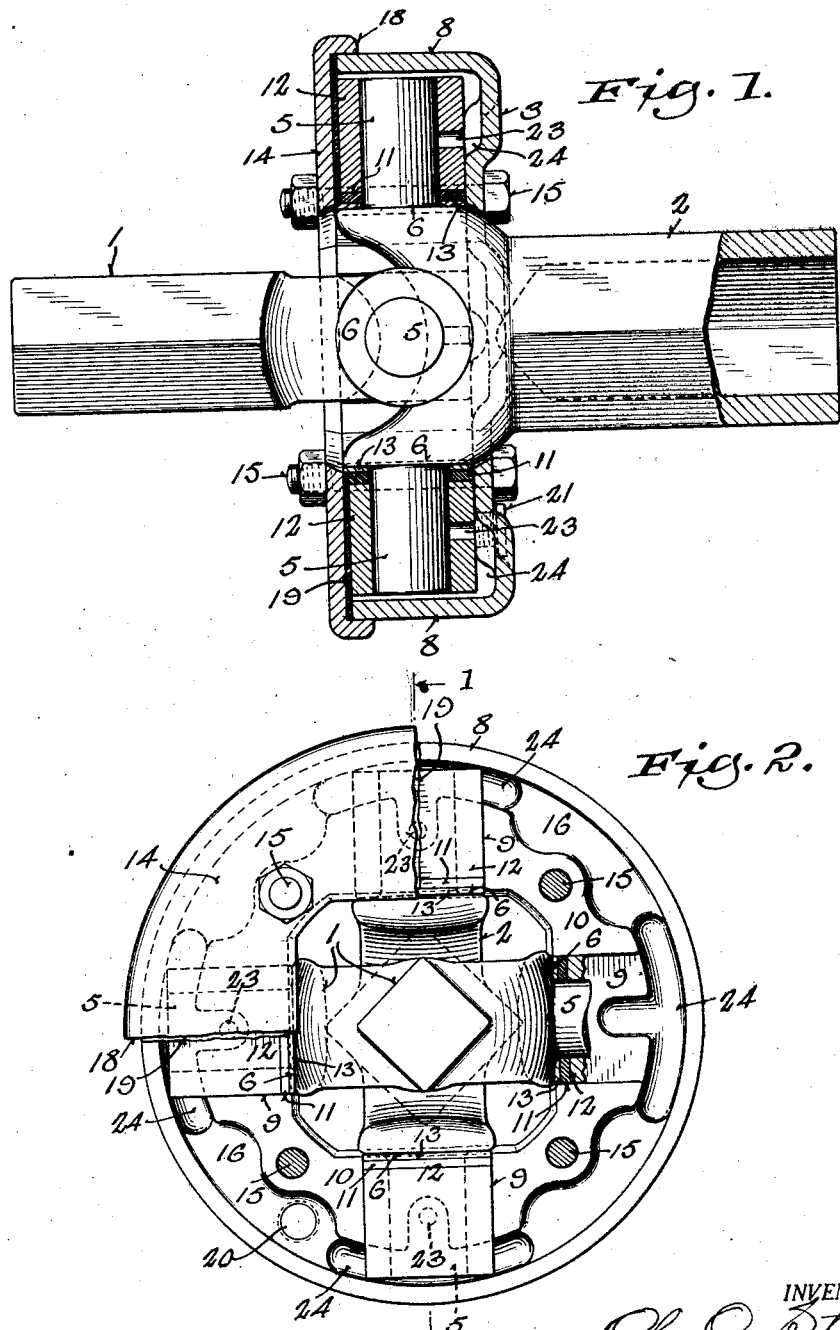

1,601,418

UNITED STATES PATENT OFFICE.

OLE O. STORLE, OF TACOMA, WASHINGTON.

UNIVERSAL JOINT.

Application filed August 17, 1922. Serial No. 582,363.

This invention relates more particularly to gimbal or universal joints for coupling rotating or non-rotating shafts or members so that they may freely assume different angles one to the other or rotary motion may be transmitted from one to the other at any given angle, at different angles, or at a variable angle.

The main objects of the invention are to exclude dust and dirt from the bearings of the joint; to provide for continuous and adequate lubrication of the bearings; and generally to simplify and improve the construction and operation of joints or couplings of this class.

It consists in the construction, arrangement and combination of parts as hereinafter particularly described and pointed out in the claims.

In the accompanying drawing like characters designate the same parts in both figures.

Figure 1 is an axial section on the line 1—1, Fig. 2, of a universal or gimbal joint or coupling embodying the invention; and Fig. 2 is an elevation of the joint or coupling as viewed from the left relative to Fig. 1, the cover of the case or housing being partially broken away.

The joint or coupling comprises three main members, two forked members 1 and 2, and a coupling member 3.

The members 1 and 2 are each formed or provided at the ends of their fork arms with axially aligned pivot pins or trunnions 5 and at the inner ends of the trunnions with wide shoulders or bearing faces 6. They are also formed or provided with means for attaching them to or connecting them with shafts or rods to be coupled together each midway between and at right angles to the pivot pins associated therewith. In the present case the member 1 is shown as formed with a square stub shaft, and the member 2 with a correspondingly shaped socket, either or each of which provides for an axially sliding or adjustable connection of a shaft or rod with the joint or coupling.

The coupling member 3 consists of an annular plate formed on one side with a peripheral or marginal flange 8 and on the same side with radial bearing seats or recesses 9, arranged in aligned pairs at right angles to each other in a wall 10, extending around the central opening in the plate and spaced from the marginal flange, as shown in Fig. 2.

Pivot or trunnion boxes or bearings 12 in which the pivot pins or trunnions 5 are journaled, are removably fitted in the recesses 9, which are preferably of square or angular cross section, to prevent the boxes from turning therein. The boxes or bearings 12 are confined between the shoulders 6 on the fork arms and the flange 8 against axial or radial displacement. Square packing gaskets 11, of suitable elastic compressible material faced with metal washers 13 fitting against the shoulders 6, prevent dust and dirt from entering the bearings through the central openings in the case or housing, and oil or lubricant from escaping from the bearings at the inner ends of the pivot pins.

The coupling member is provided on the recessed side thereof with an annular cover 14, which is detachably fastened thereto, as by bolts 15, and forms therewith a housing and a lubricant chamber 16 for the pivot pins 5 and their bearings 12.

The cover 14 is preferably formed, as shown in Fig. 1, with a marginal flange 18 fitting over the flange 8, to center the cover and hold it in place on the coupling member, and to form a tight joint therewith and prevent leakage of oil or lubricant from the chamber 16, a gasket or packing ring 19 is interposed between the cover 14 and the flange 8 and wall 10.

When the parts of the joint or coupling are thus assembled and secured together, the boxes or bearings 12 are fastened and held in place and are protected from dust and dirt.

To provide continuous and ample lubrication for the pivot pins and their bearings, the chamber 16 is filled or supplied with oil or grease. This may be done by removing the cover 14, but preferably through an opening 20 in the member 3, provided with a removable cap or plug 21. To facilitate the supply of lubricant from the chamber 16 to the trunnions 5, the bearings 12 are formed with lateral passages 23 in the sides next to the plate or member 3, which is formed with passages or channels 24 communicating with the outer ends of the passages 23.

I claim:

1. In a universal joint the combination of a coupling member consisting of an annular flanged plate formed with radial bearing recesses, pivot bearings removably fitted in said recesses, fork members provided at the ends of the fork arms with axially aligned pivot pins fitted in said bearings, an annular cover detachably fastened to the coupling member and forming therewith a housing and lubricant chamber for the bearings, packing gaskets, and non-rotatable washers to determine the position of the cover with respect to the coupling member.

2. In a universal joint the combination of an annular coupling member formed with a peripheral flange and on the same side with radial bearing recesses arranged in aligned pairs at right angles to each other, pivot bearings removably fitted in said recesses, fork members provided at the ends of their fork arms with pivot pins fitted in said bearings and formed at the inner ends of the pins with shoulders fitting against the inner ends of the bearings, an annular cover detachably fastened to the coupling member and forming therewith a housing and lubricant chamber for the bearings, and non-compressible means located between the annular coupling member and the annular cover adjacent the inner ends of the pivot bearings.

3. In a device of the character described, the combination with a housing comprising a plurality of parts fitted together to form said housing; bearings fitted therein, forked members having trunnions journaled in said bearings, and a packing gasket arranged upon each of said trunnions, of protective spacing means interposed between said gaskets and said forked members, for holding said housing parts in spaced relation with respect to each other.

4. In a universal joint of the character described, a coupling member comprising a casing and a cover therefor, a gasket arranged between said casing and said cover to provide a seal between the same, bearings secured and arranged in said casing in aligned pairs at right angles to each other, said casing and said cover cooperating to provide a lubricant chamber for said bearings, forked members provided with trunnions journaled respectively in said bearings, said casing and said cover and said gasket being provided with central registering openings to accommodate said forked members, means for holding said casing and said cover in assembled relation, and elastic gaskets arranged between said bearing members and said forked members and fitted on said trunnions, said gaskets being compressed between the inner edges of said openings in said casing and said cover and cooperating with the inner edge of said first-mentioned gasket to provide a seal for said lubricant chamber whereby lubricant is prevented from escaping therefrom and foreign matter prevented from entering the same.

5. In a universal joint of the character described, a plurality of parts fitted together to provide a housing, means for holding said parts in assembled relation, bearings fitted in said housing, forked members having trunnions journaled in said bearings, means providing a packing between said members and said bearings therefor, and rings associated with said last-mentioned means and acting to space the parts comprising said housing.

In witness whereof I hereto affix my signature.

OLE O. STORLE.